United States Patent
Ha et al.

(10) Patent No.: US 12,480,949 B2
(45) Date of Patent: Nov. 25, 2025

(54) METHODS FOR TREATING NON-SMALL LUNG CANCER AND FOR PREPARING A SAMPLE

(71) Applicants: INDUSTRY-ACADEMIC COOPERATION FOUNDATION, YONSEI UNIVERSITY, Seoul (KR); REPUBLIC OF KOREA (MINISTER OF FOOD AND DRUG SAFETY), Chungcheongbuk-do (KR)

(72) Inventors: Sang Jun Ha, Seoul (KR); Hye Ryun Kim, Seoul (KR); Hyo Sup Shim, Seoul (KR); Bo Ryeong Lee, Seoul (KR); Jung Yeon Yi, Sejong (KR); Dae Hee Hwang, Daegu (KR)

(73) Assignees: INDUSTRY-ACADEMIC COOPERATION FOUNDATION, YONSEI UNIVERSITY, Seodaemun-gu (KR); REPUBLIC OF KOREA (MINISTER OF FOOD AND DRUG SAFETY), Chungcheongbuk-do (KR)

( * ) Notice: Subject to any disclaimer, the term of this patent is extended or adjusted under 35 U.S.C. 154(b) by 1283 days.

(21) Appl. No.: 17/271,441

(22) PCT Filed: Aug. 28, 2019

(86) PCT No.: PCT/KR2019/011022
§ 371 (c)(1),
(2) Date: Feb. 25, 2021

(87) PCT Pub. No.: WO2020/045996
PCT Pub. Date: Mar. 5, 2020

(65) Prior Publication Data
US 2021/0325394 A1    Oct. 21, 2021

(30) Foreign Application Priority Data
Aug. 29, 2018 (KR) .......... 10-2018-0102288

(51) Int. Cl.
*G01N 33/574* (2006.01)
*A61P 35/00* (2006.01)
*C07K 14/705* (2006.01)
*C07K 16/28* (2006.01)

(52) U.S. Cl.
CPC ........ *G01N 33/57423* (2013.01); *A61P 35/00* (2018.01); *C07K 14/70532* (2013.01); *C07K 14/70596* (2013.01); *C07K 16/2803* (2013.01); *C07K 16/2818* (2013.01); *G01N 2333/70503* (2013.01); *G01N 2333/70532* (2013.01); *G01N 2333/70596* (2013.01)

(58) Field of Classification Search
CPC ........ C07K 14/70532; C07K 14/70596; G01N 33/57423; G01N 2333/70532; G01N 2333/70596
See application file for complete search history.

(56) References Cited

U.S. PATENT DOCUMENTS

2016/0038467 A1   2/2016  Peters
2018/0251548 A1*  9/2018  Sabzevari .......... C07K 16/3015

FOREIGN PATENT DOCUMENTS

| CN | 107208138 A | 9/2017 | |
| CN | 107988373 A | 5/2018 | |
| JP | 2018503373 A | 2/2018 | |
| KR | 20150131269 A | 11/2015 | |
| KR | 20170032350 A | 3/2017 | |
| KR | 1020180008449 A | 1/2018 | |
| KR | 1020180091024 A | 8/2018 | |
| WO | WO-2017048824 A1 * | 3/2017 | ......... A61K 39/3955 |
| WO | 2017096248 A1 | 6/2017 | |

OTHER PUBLICATIONS

Mastaglio et al, 2018 (Feb. 27, 2018), Blood Advances, 2(4): 335-346.*
Koczara et al, 2017. Cancer Res. 77(13_Supplement):2626.*
Gibney, 2016, Lancet Oncol. 17(12): e542-e551; 19 pages as printed.*
Pauken et al., "TIGIT and CD226: Tipping the Balance between Costimulatory and Coinhibitory Molecules to Augment the Cancer Immunotherapy Toolkit", Cancer Cell, vol. 26, Dec. 8, 2014, pp. 785-787.
First Office Action received for CN Patent Application No. 201980057005.9, mailed on Sep. 29, 2023, 17 pages (8 pages of Official copy and 9 pages of English translation).
Alice L. Hung, TIGIT and PD-1 dual checkpoint blockade enhances antitumor immunity and survival in GBM, ISSN: (Print) 2162-402X (Online) Journal homepage: https://www.tandfonline.com/loi/koni20, Oncoimmunology, 2018.
Hauke Stamm, Immune checkpoints PVR and PVRL2 are prognostic markers in AML and their blockade represents a new therapeutic option, Revised: Mar. 8, 2018 / Accepted: Apr. 2, 2018 / Published online: May 31, 2018, Oncogene (2018) 37:5269-5280, https://doi.org/10.1038/s41388-018-0288-y.
International Search Report of PCT/KR2019/011022.
Office Action issued for KR10-2018-0102288.

* cited by examiner

*Primary Examiner* — Zachary C Howard
(74) *Attorney, Agent, or Firm* — AEON Law, PLLC; Adam L. K. Philipp; Charlotte E. Holoubek

(57) ABSTRACT

Provided in the present disclosure are a method for providing information on a therapeutic reaction of cancer immunotherapy and a kit using same for providing information, the method comprising the steps of: measuring respective expression levels of PD-L1 and PVR in a biological sample isolated from a subject; and evaluating the therapeutic reaction of cancer immunotherapy for the subject on the basis of the measured expression levels of PD-L1 and PVR.

8 Claims, 12 Drawing Sheets

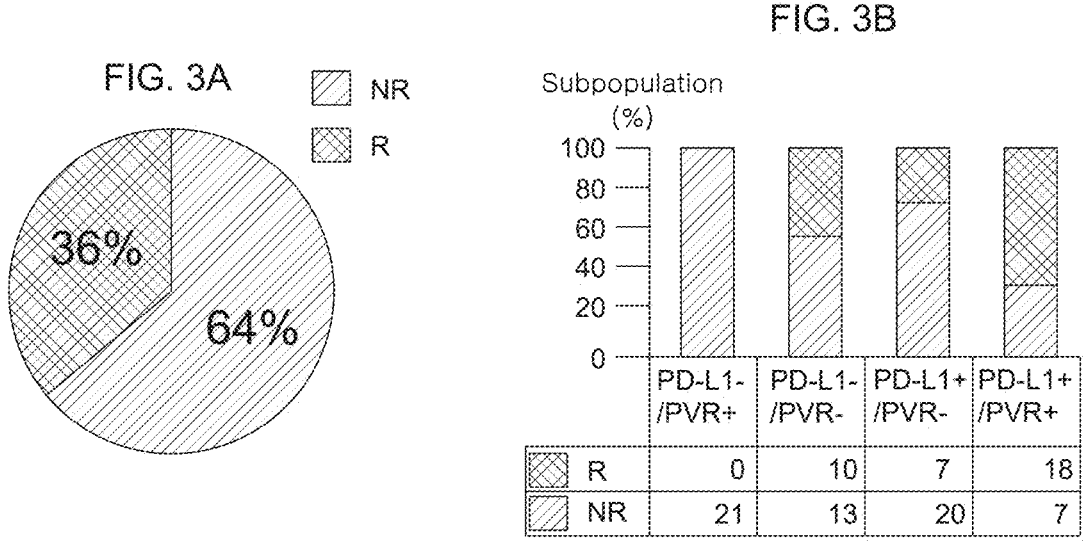
FIG. 3A
FIG. 3B
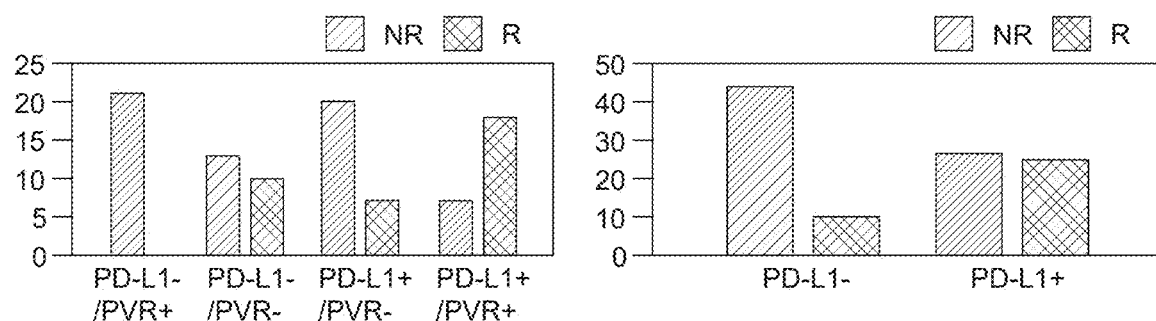
FIG. 3C
FIG. 3D
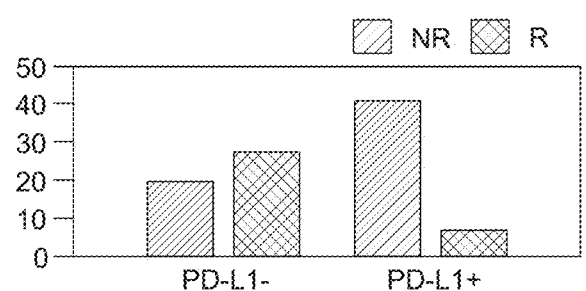
FIG. 3E

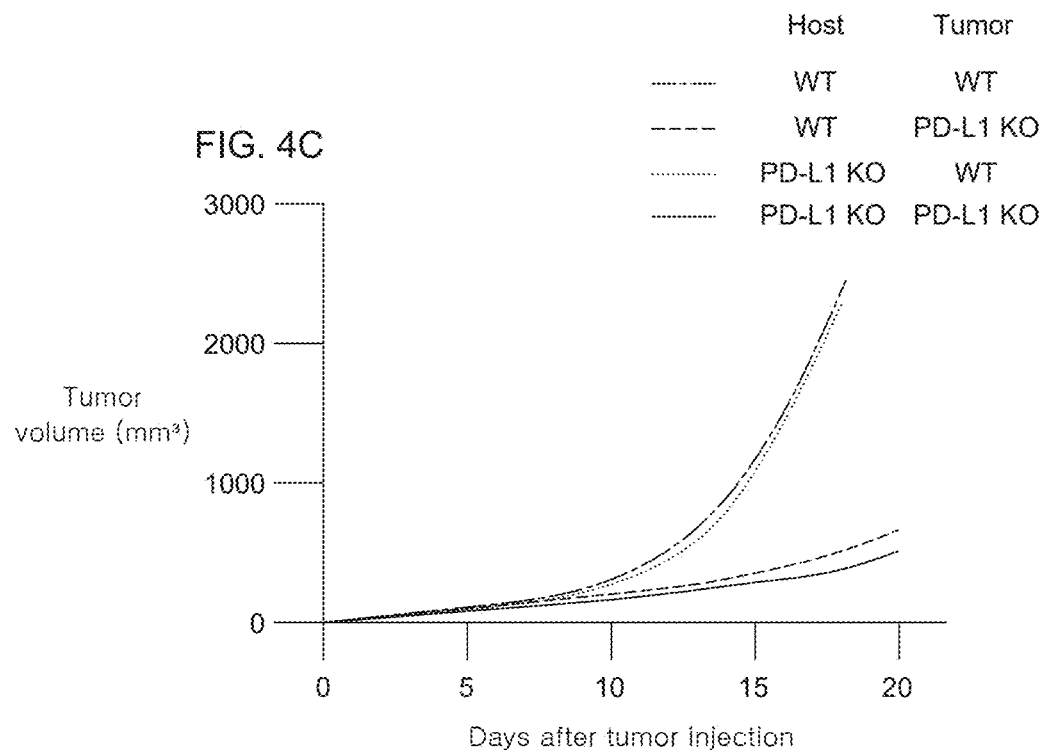
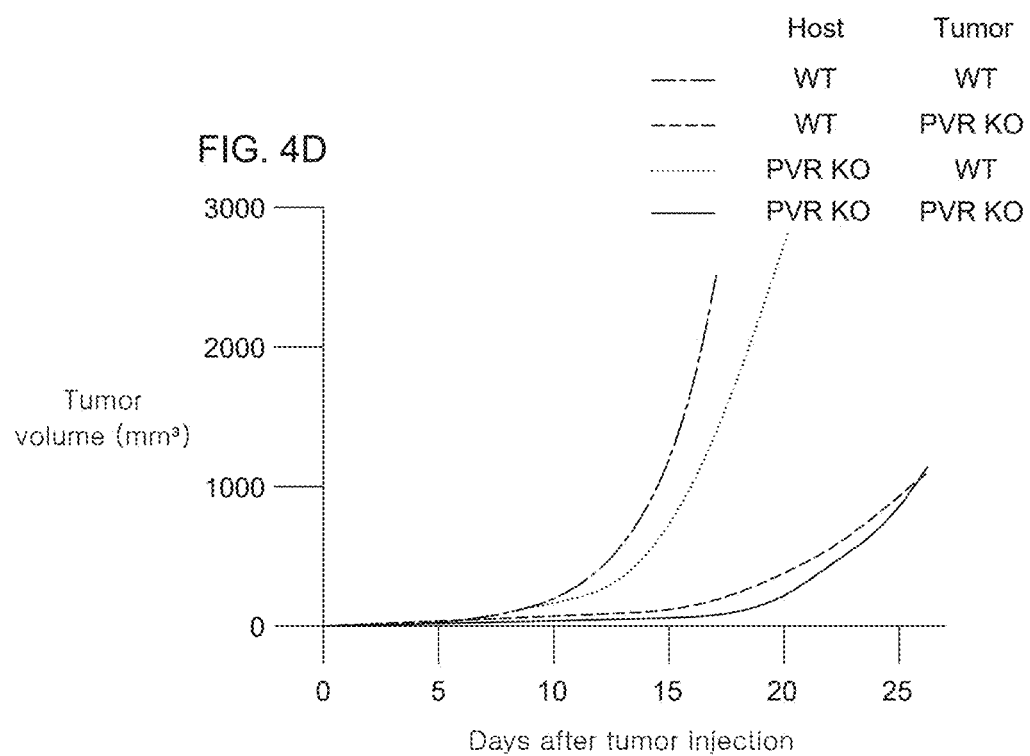

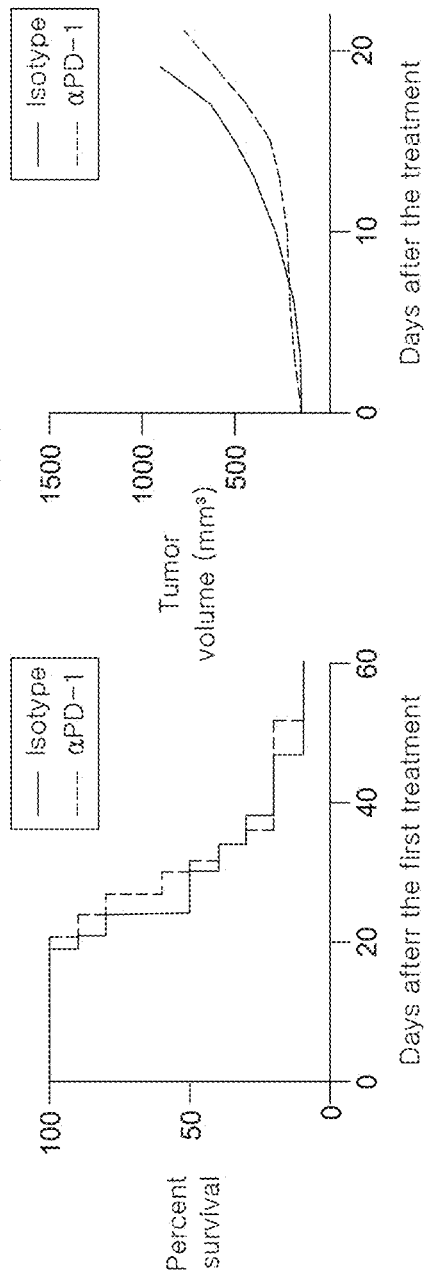
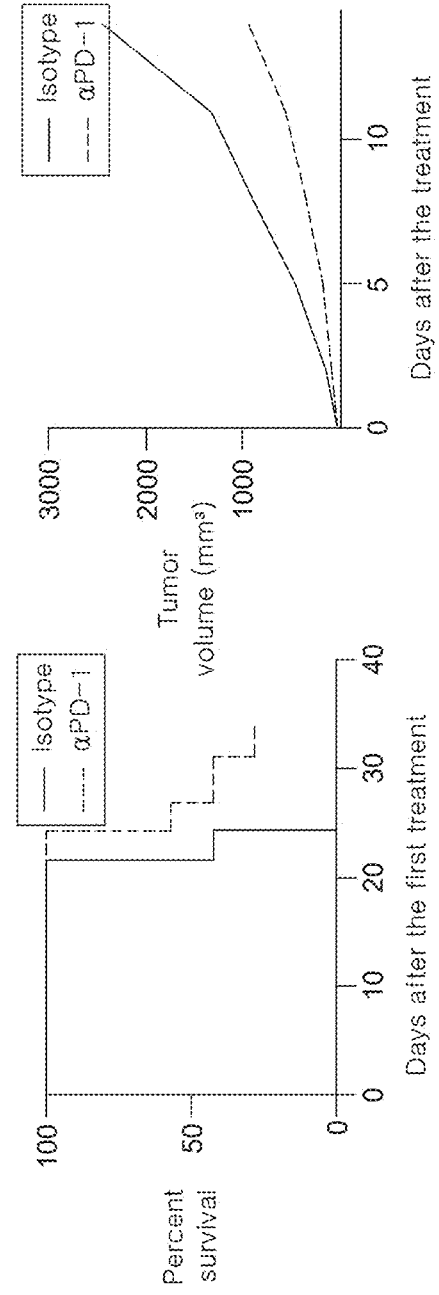

METHODS FOR TREATING NON-SMALL LUNG CANCER AND FOR PREPARING A SAMPLE

TECHNICAL FIELD

The present disclosure relates to a method for providing information related to a therapeutic response to cancer immunotherapy. More specifically, the present disclosure relates to a method for providing information on a therapeutic response to cancer immunotherapy for non-small lung cancer using biomarkers and a kit based on the same.

BACKGROUND ART

Lung cancer is one of the most common cancers in both sexes. Among lung cancers, non-small lung cancer (NSLC) is a type of epithelial carcinoma and refers to all epithelial lung cancers other than small lung cancer. The non-small lung cancer accounts for a high percentage of a total incidence of lung cancers.

In this connection, the non-small lung cancer is classified into several subtypes according to the size, shape and chemical composition of tumor cells. Representative examples thereof include adenocarcinoma, squamous cell carcinoma, large cell carcinoma, and the like. Adenocarcinoma is found in the outer region of the lung and tends to progress more slowly than other lung cancers, but has a high tendency to metastasize at an early stage and also has high radiation resistance. Squamous cell carcinoma begins in the early version of the cells forming the airway, and has a high incidence mainly in smokers. Furthermore, large cell carcinoma can develop anywhere in the lung, and progression thereof is fast enough to be similar to that of small cell lung cancer, and the treatment thereof has emerged as a challenge to date.

Symptoms of such non-small lung cancer include persistent cough, chest pain, weight loss, nail damage, joint pain, shortness of breath, and the like. However, since non-small lung cancer progresses more slowly than other cancers, it rarely exhibits symptoms at the beginning stage thereof. Therefore, early detection and treatment of non-small lung cancer are difficult. NSLC is highly likely to be detected after metastasis to the whole body, such as bone, liver, small intestine, and brain. Therefore, when diagnosing the non-small lung cancer, greater than half of the patients are in a metastasis state enough to be unable to perform surgery. Thus, early treatment thereof is practically difficult. Further, when non-small cell cancer is not in the metastasis state enough to perform surgical operation, prior surgery such as radical resection is performed. However, only about 30% of cases can be subject to radical resection. Furthermore, it is shown that in the majority of all patients who underwent radical resection, more aggressive cancer can recur after the surgical resection, resulting in death.

For this reason, for the early treatment of non-small lung cancer, the development of a new treatment method and further development of a new method to predict the therapeutic response to the existing treatment method are continuously required.

This Background Art section is written to facilitate understanding of the present disclosure. It should not be appreciated that the matters described in Background Art section are regarded as prior art.

DETAILED DESCRIPTION OF THE INVENTION

Technical Problems

The use of an immune checkpoint blockade has been proposed as a treatment method for non-small lung cancer. In particular, PD-1 (programmed cell death-1)/PD-L1 (programmed cell death ligand-1) blockage as approved by the Food and Drug Administration was shown to be effective in the treatment of non-small lung cancer.

In one example, in predicting the therapeutic response to PD-L1 blockage, tumor PD-L1 expression by immunohistochemistry (IHC) can be used as the best prediction biomarker for PD-1 blockage. However, the accuracy of prediction of the therapeutic response to PD-1 which is dependent on PD-L1 expression in tumor cells is not high enough to confirm drug efficacy. More specifically, patients with PD-L1 expression negative can respond to PD-1 blockage, patients with PD-L1 expression positive cannot respond to PD-1 blockage. Furthermore, some responding patients without PD-L1 can have a response duration similar to that of PD-L1 positive in clinical trials (e.g., Checkmate 057). Moreover, PD-L1 expression can be dynamic, and can change temporally and spatially. This change in PD-L1 expression can be adaptive immune resistant as exerted by tumor.

Further, the present inventors noted that immune checkpoints such as PD-1 as well as TIGIT can be involved in the anticancer immune response by T cells, and that the ligand highly expressed in the tumor microenvironment inhibits T cell activity via receptor-ligand interactions. As a result, the present inventors have discovered that in cancer immunotherapy based on blockage of the binding of PD-1 and PD-L1, the function of T cells could not be completely restored by the interaction of a receptor such as TIGIT different from PD-L1 and a ligand that binds thereto.

As a result, the present inventors were able to recognize that in cancer tissues of non-small lung cancer patients that do not respond to anti-PD-1/PD-L1 therapy, the expression of other immune checkpoint ligands is high.

Accordingly, the present inventors analyzed the expression correlation of immune checkpoint receptor or immune checkpoint ligand expressed in tissues of patients with non-small lung cancer, and then discovered a ligand that forms a cluster independently of PD-L1, unlike the case where the expression of most immune checkpoint receptors shows a high correlation with PD-1. In particular, the present inventors have recognized that specific ligands including PVR (poliovirus receptor) as the ligand of TIGIT have a low correlation with PD-L1 expression and thus can be used as a biomarker that can be used independently of PD-L1 in predicting a therapeutic response to PD-1 blockage.

As a result, the present inventors have come to develop a method for providing information on therapeutic responses to new cancer immunotherapy via the analysis of PD-L1 and PVR expressed in tumor cells or immune cells as a biomarker for predicting a therapeutic response to cancer immunotherapy for on-small lung cancer, especially PD-1 blockage.

Accordingly, a purpose of the present disclosure is to provide a method for providing information on the therapeutic response to cancer immunotherapy, the method including measuring the expression level of PD-L1 and PVR for biological samples separated from the subject, and predicting the therapeutic response to cancer immunotherapy based on expression patterns thereof.

Another purpose of the present disclosure is to provide a method for providing information about the therapeutic response to cancer immunotherapy, in which the method can present cancer immunotherapy that is predicted to have good prognosis for each subject, based on the expression patterns of PD-L1 and PVR measured from biological samples.

Another purpose of the present disclosure is to provide a method for providing information on the therapeutic response to cancer immunotherapy, the method including measuring the expression levels of PVR for each biological sample isolated from the subject before and other cancer immunotherapy is performed, and predicting the therapeutic response to cancer immunotherapy, based on the measured levels.

Another purpose of the present disclosure is to provide a kit for providing information on therapeutic response to cancer immunotherapy, in which the kit can provide information related to diagnosis for lung cancer, especially non-small lung cancer.

The purposes of the present disclosure are not limited to the purposes mentioned above. Other purposes not mentioned will be clearly understood by those skilled in the art from the following description.

Means for Solving the Problems

According to an embodiment of the present disclosure, a method for providing information on therapeutic responses to cancer immunotherapy is provided. The method includes measuring expression levels of PD-L1 and PVR, respectively for a biological sample isolated from a subject, and evaluating a therapeutic response to cancer immunotherapy for the subject, based on the measured expression levels of PD-L1 and PVR.

According to one feature of the present disclosure, the subject is a subject suspected of non-small lung cancer. The biological sample can include at least one selected from the group consisting of tumor tissue, peripheral blood, serum, and plasma.

As used herein, the term "non-small lung cancer" is a type of epithelial cancer and refers to all epithelial lung cancers other than small lung cancer. In one example, cancer immunotherapy for such non-small lung cancer can include anti-PD-1 therapy, anti-TIGIT therapy, or anti-PD-1/anti-TIGIT combination therapy.

As used herein, the term "anti-PD-1 therapy" can be a treatment method configured to block a mechanism by which T cells cannot attack tumor cells. More specifically, anti-PD-1 therapy can be based on preventing the binding of PD-L1 and PD-L2 as immune checkpoint ligands of surface proteins of the tumor cell and with PD-1 as an immune checkpoint receptor of proteins on the surface of T cells. For example, when an immuno-oncology drug binds to the PD-1 receptor of T cells, it can inhibit the evasion function of T cells from the tumor cells. Therefore, in the present disclosure, "anti-PD-1 therapy" can be used as the same meaning as "PD-1 pathway blockage".

In one example, as used herein, the term "anti-TIGIT therapy" can be based on inhibiting the binding of PVR as an immune checkpoint ligand of tumor cells to TIGIT as a protein on the surface of T cells. For example, when an immuno-oncology drug such as a TIGIT blockade binds to a TIGIT receptor of T cells, it can inhibit the evasion function of T cells from the tumor cells. Thus, in the present disclosure, "anti-TIGIT therapy" can be used as the same meaning as "TIGIT blockage".

According to another feature of the present disclosure, cancer immunotherapy disclosed in the specification can refer to a single therapy performed on a subject alone, or a plurality of therapies performed concurrently with each other. For example, the cancer immunotherapy can be one therapy performed alone or multiple therapies performed concurrently as selected from a group consisting of anti-CTLA-4 therapy, anti-PD-1 therapy, anti-CD28 therapy, anti-KIR therapy, anti-TCR therapy, anti-LAG-3 therapy, anti-TIM-3 therapy, anti-TIGIT therapy, anti-A2aR therapy, anti-ICOS therapy, anti-OX40 therapy, anti-4-1BB therapy, and anti-GITR therapy.

In one example, PD-L1 or/and PVR expressed in a biological sample obtained from a subject can be used as a marker for predicting response to cancer immunotherapy, particularly, anti-PD-1 therapy or anti-TIGIT therapy. In this connection, the biological sample can be a tumor tissue obtained from a subject before or after anti-PD-1 therapy is performed, but is not limited thereto.

In various embodiments of the present disclosure, presence or absence of the expression of PD-L1 and PVR for the tumor tissue obtained from a subject subjected to anti-PD-1 therapy can be used to determine anti-PD-1 therapeutic response positive or negative of the subject. For example, a subject having PD-L1 expression positive and PVR expression negative (PD-L1+/PVR−) can be evaluated to have higher response to the anti-PD-1 therapy, compared to one of a subject having PD-L1 expression positive and PVR expression positive (PD-L1+/PVR+), a subject having PD-L1 expression negative and PVR expression negative (PD-L1−/PVR−) and a subject having PD-L1 expression negative and PVR expression positive (PD-L1−/PVR+).

In particular, even when PD-1 blockade is administered to subjects with positive PVR expression, the loss of T cell function is caused by PVR and TIGIT. Thus, the subjects with positive PVR expression can have low therapeutic response to PD-1 blockage. Accordingly, it can be predicted that a subject (PD-L1−/PVR+) with PD-L1 expression negative and PVR expression positive can have relatively lower therapeutic response to anti-PD-1 therapy than that of other subjects. Thus, according to the information provision method according to an embodiment of the present disclosure, cancer immunotherapy other than anti-PD-1 therapy can be proposed, or combination therapy of another anti-cancer therapy with anti-PD-1 therapy can be proposed for the subject (PD-L1−/PVR+) with PD-L1 expression negative and PVR expression positive. For example, anti-TIGIT therapy or anti-PD-1/anti-TIGIT combination therapy can be suggested to the subject (PD-L1−/PVR+) with PD-L1 expression negative and PVR expression positive.

In this connection, absence or presence of the expression of PD-L1 and PVR, that is, expression positive (+) or expression negative (−) thereof can be determined based on whether an expression level thereof is equal to or above a predetermined level. For example, when the expression level in a tumor tissue is greater than or equal to the median cut-off value, the expression of PD-L1 and PVR can be determined as expression positive. When the expression level in the tumor tissue is lower than the median cut-off value, the expression of PD-L1 and PVR can be determined as expression negative. In this connection, the expression level used for determining expression positive or negative can be set in various ranges.

In one example, as used herein, the term "therapeutic response positive" can refer to a response in which a receptor on the surface of T cells is prevented from binding to a ligand on the surface of a tumor cell by immune checkpoint blockades such as PD-1 blockade and TIGIT blockade. However, the disclosure is not limited thereto. The positive therapeutic response can include the occurrence of any response associated with a favorable prognosis or alleviation of symptoms of non-small lung cancer by an immune checkpoint blockade. Therefore, for subjects with positive anti-PD-1 therapeutic response, symptoms of non-small lung cancer can be alleviated by anti-PD-1 therapy. Subjects with negative anti-PD-1 therapeutic response can have relatively poor prognosis following the anti-PD-1 therapy.

In one example, according to another embodiment of the present disclosure, a method for providing information on therapeutic responses to cancer immunotherapy is provided, the method including a first step of measuring the expression levels of PVR for each biological sample isolated from a subject before and after cancer immunotherapy is performed, and a second step of evaluating a therapeutic response to the cancer immunotherapy for the subject based on the expression levels of PVR.

According to one feature of the present disclosure, cancer immunotherapy can be anti-PD-1 therapy. Furthermore, a subject whose expression level of PVR is higher than the level before anti-PD-1 is performed can be evaluated to have the response to anti-PD1 therapy lower than that of the subject whose expression level of PVR is equal to or lower than the level before anti-PD-1 is performed.

According to another embodiment of the present disclosure, a kit for providing information on a therapeutic response to cancer immunotherapy is provided, the kit including formulations configured to measure expression levels of PD-L1 and PVR, respectively, for a biological sample isolated from a subject.

According to one feature of the present disclosure, the kit for providing information is configured to present positive or negative therapeutic response to cancer immunotherapy based on a predetermined expression level of each of PD-L1 and PVR. The cancer immunotherapy can be one selected from the group consisting of anti-PD-1 therapy, anti-TIGIT therapy, and anti-PD-1/anti-TIGIT combination therapy.

According to another feature of the present disclosure, the kit for providing information is further configured to present positive therapeutic response to anti-PD-1 therapy when the subject has expression level of PD-L1 higher than or equal to a predetermined expression level and expression level of PVR lower than a predetermined expression level.

According to another feature of the present disclosure, the kit for providing information is further configured to present negative therapeutic response to anti-PD-1 therapy, or positive therapeutic response to anti-TIGIT therapy or anti-PD-1/anti-TIGIT combination therapy when the subject has expression level of PD-L1 lower than a predetermined expression level and the expression level of PVR greater than or equal to a predetermined expression level.

In this connection, the predetermined expression level can be an expression level of 1% to 10%. The subject is a subject suspected of non-small lung cancer. The biological sample can include at least one selected from a group consisting of tumor tissue, blood, serum, and plasma and can be isolated from the subject before or after the cancer immunotherapy is performed. However, the disclosure is not limited thereto.

Furthermore, the formulation is not limited to the above formulation. The formulation can include at least one selected from B7-1, B7-2, PD-L1/2, MHC I/II, CEACAM-1/PtdSer, PVR, ICOSL, OX40L, 4-IBBL, and GITRL. The cancer immunotherapy can include at least one therapy selected from a group consisting of anti-CTLA-4 therapy, anti-PD-1 therapy, anti-CD28 therapy, anti-KIR therapy, anti-TCR therapy, anti-LAG-3 therapy, anti-TIM-3 therapy, anti-TIGIT therapy, anti-A2aR therapy, anti-ICOS therapy, anti-OX40 therapy, anti-4-1BB therapy and anti-GITR therapy.

Hereinafter, the present disclosure will be described in more detail based on Examples. However, since these Examples are merely for illustrative purposes of the present disclosure, the scope of the present disclosure should not be construed as being limited to these Examples.

Effects of the Invention

The present disclosure has the effect of providing a new blood biomarker capable of predicting a therapeutic response to cancer immunotherapy especially PD-blockage.

More specifically, the present disclosure has the effect of predicting the therapeutic response to PD-1 blockage based on the expression patterns of two biomarkers. Therefore, according to the present disclosure, as at least two biomarkers can be used to predict the early therapeutic response to the PD-1 blockage for a subject, there is the effect of providing information so that whether anti-PD-1 therapy is to be conducted can be determined at a higher prediction ability.

Furthermore, the present disclosure has the effect of providing cancer immunotherapy that can be more effective, based on an expression pattern of a biomarker. For example, according to the present disclosure, the method can distinguish subjects having positive therapeutic responses to anti-PD-1 from subjects having negative therapeutic responses to anti-PD-1. Thus, the method can provide cancer immunotherapy based on blockage of new immune checkpoint ligand-receptor binding for the subjects having negative therapeutic responses to anti-PD-1. Accordingly, the present disclosure can help to maximize the effect of cancer immunotherapy when applied in clinical practice. Furthermore, the present disclosure can help to minimize the side effects and unnecessary expenditures related to the patient's treatment.

The effect of the present disclosure is not limited by the contents illustrated above. Further effects are included within the present disclosure.

BRIEF DESCRIPTION OF THE DRAWINGS

FIGS. 3A to 3H show the evaluation results for therapeutic response prediction to anti-PD-1 therapy of non-small lung cancer patients, according to the expression patterns of PD-L1 and PVR used as biomarkers in various embodiments of the present disclosure.

FIGS. 4A to 4H show the results of verifying the therapeutic response to the anti-PD-1 therapy in a mouse model, according to the expression patterns of PD-L1 and PVR used as biomarkers in various embodiments of the present disclosure, using gene regulations.

BEST MODES FOR CARRYING OUT THE INVENTION

Advantages and features of the present disclosure, and a method of achieving them will become apparent with reference to the embodiments described later in detail together with the accompanying drawings. However, the present disclosure is not limited to the embodiments disclosed below, but will be implemented in various different forms. Only these embodiments make the disclosure of the present disclosure complete and are provided to completely inform the scope of the disclosure to those with ordinary knowledge in the technical field to which the present disclosure belongs. The present disclosure is only defined by the scope of the claims.

Hereinafter, a procedure of a method for providing information on a therapeutic response to cancer immunotherapy according to an embodiment of the present disclosure will be described in detail with reference to FIG. 1.

Figure 1:
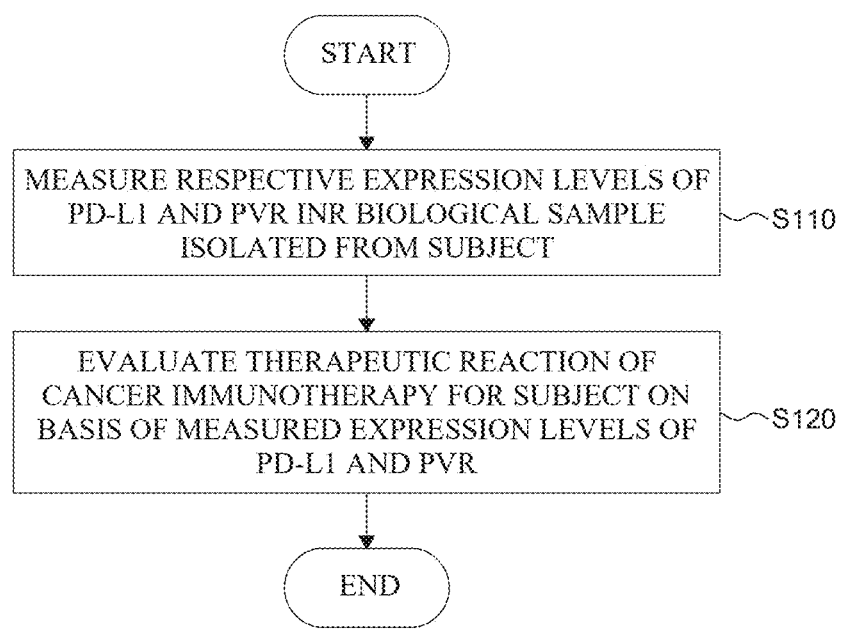
FIG. 1 shows an exemplary procedure of a method for providing information on a therapeutic response to cancer immunotherapy according to an embodiment of the present disclosure.

FIG. 1 shows an exemplary procedure of a method for providing information on a therapeutic response to cancer immunotherapy according to an embodiment of the present disclosure.

Referring to FIG. 1, a method for providing information on a therapeutic response to cancer immunotherapy according to an embodiment of the present disclosure includes first, measuring expression levels of PD-L1 and PVR, respectively for a biological sample isolated from a subject (S110), and evaluating a therapeutic response to cancer immunotherapy for the subject, based on the measured expression levels of PD-L1 and PVR (S120).

According to an embodiment of the present disclosure, in the step of measuring the expression level (S110), the expression levels of PD-L1 and PVR are measured for biological samples such as tumor tissue, blood, serum, or plasma isolated from a subject suspected of the non-small lung cancer.

According to an embodiment of the present disclosure, the step of evaluating the therapeutic response to cancer immunotherapy (S120) can include: when the measured expression level of each of the PD-L1 and PVR is greater than or equal to a predetermined level, determining each of expressions of PD-L1 and PVR as positive; when the measured expression level of each of the PD-L1 and PVR is lower to the predetermined level, determining each of expressions of PD-L1 and PVR as negative; and evaluating the therapeutic response to the cancer immunotherapy, based on whether the expressions of PD-L1 and PVR are negative or positive.

In this connection, the cancer immunotherapy includes one therapy selected from a group consisting of anti-PD-1 therapy, anti-TIGIT therapy, and anti-PD-1/anti-TIGIT combination therapy. However, the disclosure is not limited thereto. For example, the cancer immunotherapy can include at least one therapy selected from the group consisting of anti-CTLA-4 therapy, anti-CD28 therapy, anti-KIR therapy, anti-TCR therapy, anti-LAG-3 therapy, anti-TIM-3 therapy, anti-A2aR therapy, anti-ICOS therapy, anti-OX40 therapy, anti-4-1BB therapy, and anti-GITR therapy.

According to another embodiment of the present disclosure, the step of evaluating the therapeutic response to cancer immunotherapy (S120) can include evaluating that a subject having the PD-L1 expression positive and the PVR expression negative has the therapeutic response to anti-PD-1 therapy higher than the therapeutic response to anti-PD-1 therapy of one of a subject having the PD-L1 expression positive and the PVR expression positive, a subject having the PD-L1 expression negative and the PVR expression negative, and a subject having the PD-L1 expression negative and the PVR expression positive.

According to the above procedure, the method tier providing information on a therapeutic response according to an embodiment of the present disclosure can measure the levels of various markers, and thus can provide information to allow a therapeutic response to the cancer immunotherapy for a subject, particularly, a therapeutic response to anti-PD-1 to be early predicted.

Example 1: Biomarker Setup for Early Prediction of Therapeutic Response to PD-1 Blockade Hereinafter, with reference to FIGS. 2A to 2D, biomarkers used for prediction method of therapeutic responses to the cancer immunotherapy, in particular, anti-PD-1 therapy, according to various embodiments of the present disclosure, and therapeutic response prediction method using the same will be described.

FIGS. 2A to 2D show the expression correlation and expression pattern of PD-L1 and PVR in cancer tissues of non-small lung cancer patients.

Figure 2A:
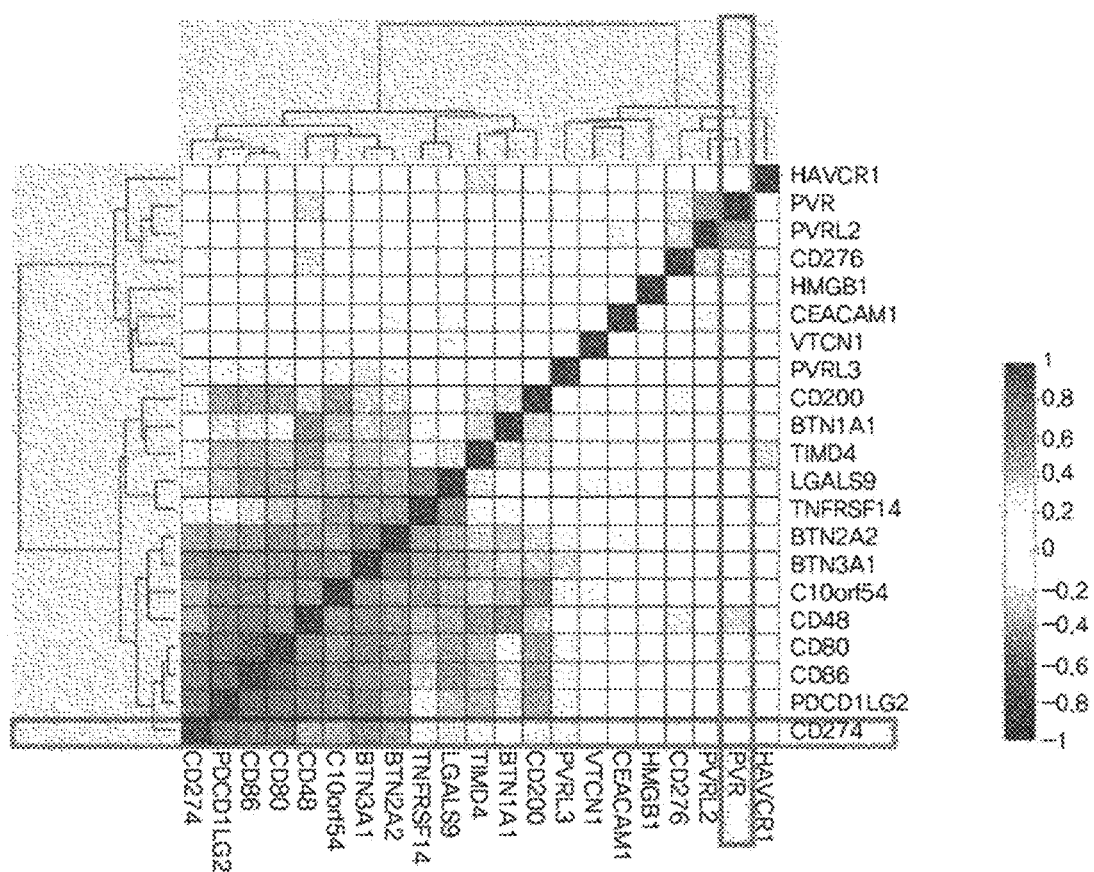
FIGS. 2A to 2D show the expression correlation and expression pattern of PD-L1 and PVR in cancer tissues of non-small lung cancer patients.

Referring to FIG. 2A, the results of correlation analysis on the expression of immune checkpoint ligands for non-small lung cancer patient data using TCGA (the cancer genome atlas) as a common patient database are shown. More specifically, the expression of the immune checkpoint ligand PD-L1 (CD 274), which is a target for the treatment of non-small lung cancer, appeared to have a high correlation with CD 86, CD 80, and BTN3A1. On the other hand, PVR appeared to have a low correlation with PD-L1 and a ligand that correlates with PD-L1. Accordingly, since the expression of PVR is independent of PD-L1 expression, PVR can be used as a biomarker that can be used together with or independently of PD-L1 in the prediction of a PD-1 blockage therapeutic response.

Figure 2B:
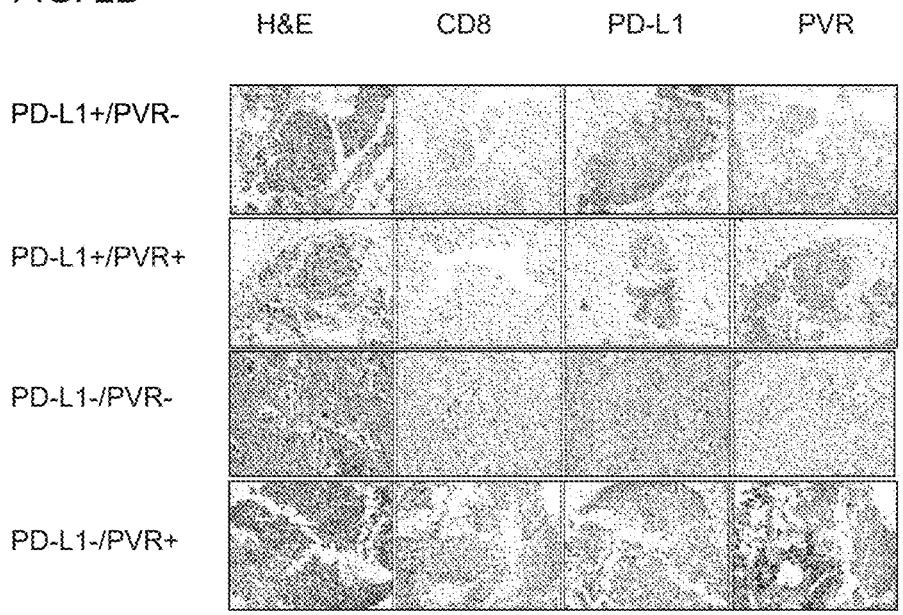
Figure 2C:
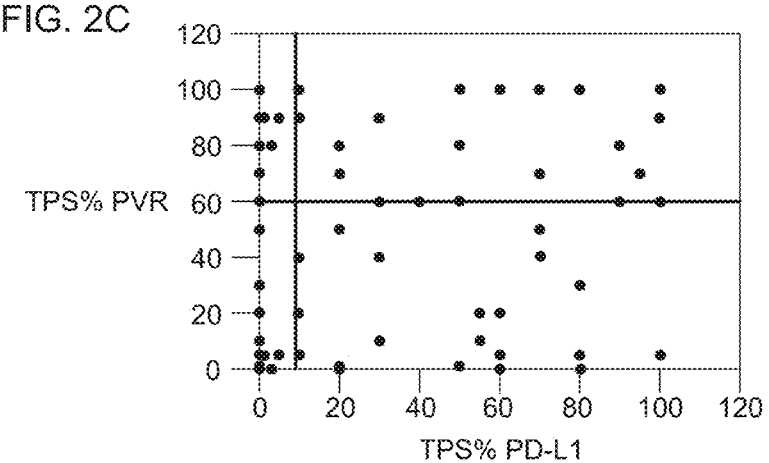
Figure 2D:
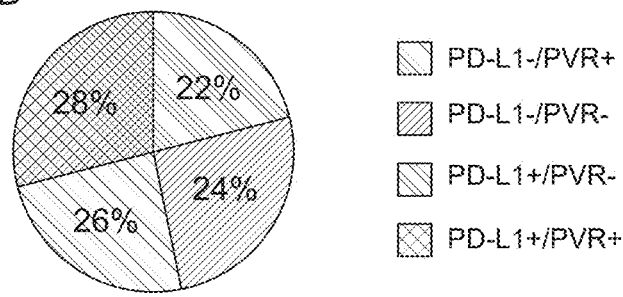

Referring to FIGS. 2B to 2D, the results of the analysis of the expression patterns of PD-L1 and PVR in tumor tissue obtained from non-small lung cancer patients subjected to anti-PD-1 therapy are shown. Referring to FIG. 2C, the distribution pattern of the tumor proportion score (TPS) of PD-L1 and PVR as analyzed in the tumor tissue of each patient is shown. The median cut-off values for PD-L1 and PVR were TPS 10% and TPS 60%, respectively. Based on these values, in this experiment, it is determined that when the expression level for each of PD-L1 and PVR is higher than or equal to the median cut-off value (PD-L1: TPS 10%, PVR: TPS 60%), the expression of each of PD-L1 and PVR is positive, whereas when the expression level for each of PD-L1 and PVR is lower than the median cut-off value, the expression of each of PD-L1 and PVR is negative. Accordingly, patients with non-small lung cancer can be classified into patients having PD-L1 positive and PVR positive (PD-L1+/PVR+), PD-L1 positive and PVR negative (PD-L1+/PVR−), PD-L1 negative and PVR positive (PD-L1−/PVR+) and PD-L1 negative and PVR negative (PD-L1−/PVR−). Referring to FIG. 2D, about 24% of patients with non-small lung cancer belong to PD-L1−/PVR−, and about 22% thereof belong to PD-L1+/PVR−.

Based on a result of Example 1 above, PVR, or PD-L1 and PVR can be used as biomarkers for prediction of a therapeutic response in a method for providing information about a therapeutic response according to various embodiments of the present disclosure.

Example 2: Early Prediction of Therapeutic Response to PD-1 Blockade Based on PD-L1 and PVR Expression Patterns for Non-Small Lung Cancer Patients Hereinafter, an evaluation result of the therapeutic response prediction to the anti-PD-1 therapy according to the expression patterns of PD-L1 and PVR in the tumor tissue of a non-small lung cancer patient will be described with reference to FIGS. 3A to 3H.

FIGS. 3A to 3H show the evaluation results for therapeutic response prediction to the anti-PD-1 therapy of non-small lung cancer patients according to the expression patterns of PD-L1 and PVR used as biomarkers in various embodiments of the present disclosure.

In the following experiment, 119 patients having recurrent/metastatic non-small lung cancer over the age of 20 as confirmed, for which previous platinum-based chemotherapy failed, and who underwent the PD-1 blockage at least once were set as the experimental group. In this connection, treatment efficacy was evaluated based on clinical responses defined as CR (complete response), PR (partial response) and SD (stable disease) using contrast-enhanced CT approximately 8 weeks after the first injection of nivolumab. A responder (R) was defined as a patient with a PR or SD of greater than or equal to 6 months and a non-responder (NR) was defined as a patient having a PD or SD of smaller than 6 months.

Referring to FIGS. 3A and 3B, the evaluation results of the response to anti-PD-1 therapy according to RECIST (response evaluation criteria in solid tumors) are shown. More specifically, referring to FIG. 3A, 38% of the total patient group exhibited a response to anti-PD-1 therapy at the baseline level (pretreatment). In one example, referring to FIG. 3B, when the expression levels of PD-L1 and PVR were considered together, the response prediction ability to anti-PD-1 therapy was improved than when the expression of PD-L1 was used alone. In particular, among the patient group with PD-L1 expression positive, patients with PVR expression negative (PD-L1+/PCR−) had higher response to PD-1 blockade therapy, compared to patients with PVR expression positive (PD-L1+/PCR+). Referring to FIGS. 3C to 3E, the accuracy of prediction can be improved when both PD-L1 and PVR were used as biomarkers for response prediction to PD-1 blockade therapy, compared to when PD-L1 or PVR was used alone.

Figure 3F:
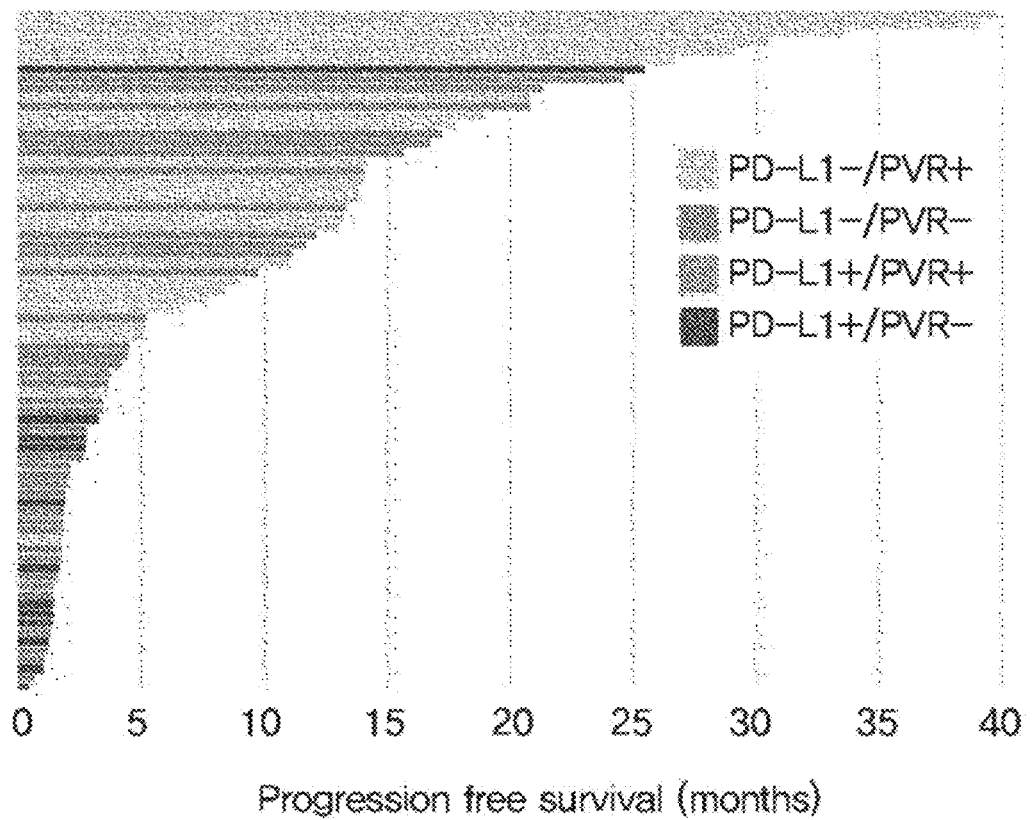

Referring to FIG. 3F, progression-free survivals of non-small lung cancer patients with 4 expression patterns of PD-L1+/PVR−, PD-L1+/PVR+, PD-L1−/PVR− and PD-L1−/PVR+ are shown. More specifically, when considering both PD-L1 and PVR as markers of the response to the PD-1 blockade therapy, the PD-L1+/PVR− patient group as predicted to have the highest therapeutic response exhibited the highest progression-free survival compared to the rest of the groups. Furthermore, the PD-L1−/PVR− and PD-L1−/PVR+ patient groups predicted to have a low therapeutic response to PD-1 blockage exhibited lower progression-free survival compared to the rest of the groups.

Figure 3G:
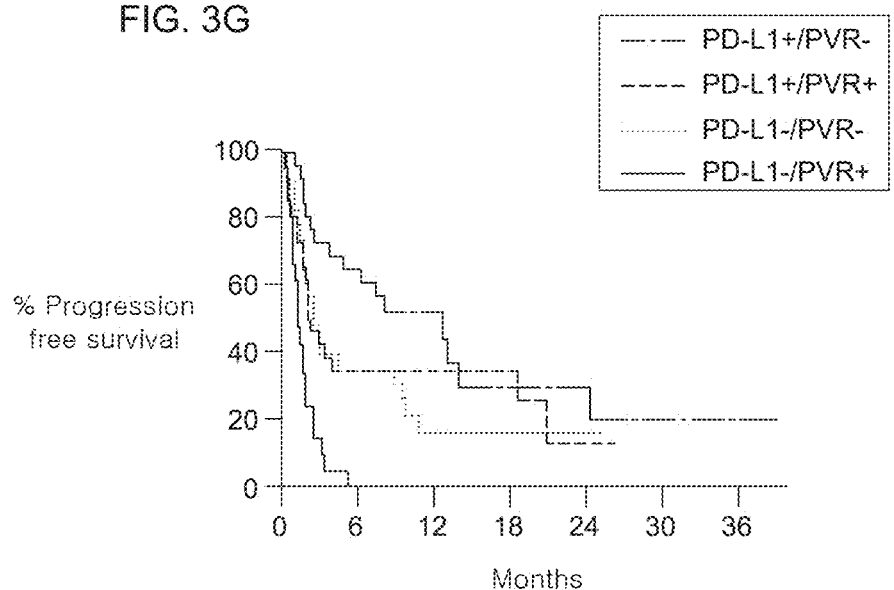
Figure 3H:
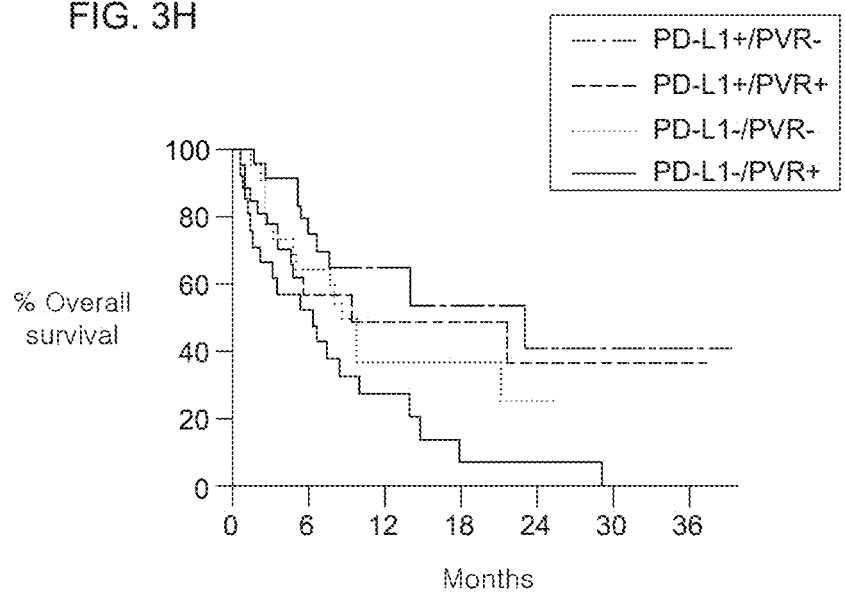

Referring to FIGS. 3G and 3H, progression-free survival and overall survival for patients with non-small lung cancer having 4 expression patterns: PD-L1+/PVR−, PD-L1+/PVR+, PD-L1−/PVR− and PD-L1−/PVR+ are shown. As shown in FIGS. 3G and 3H, the PD-L1+/PVR− patient group, which is predicted to have the highest therapeutic response, exhibited the highest progression-free survival and overall survival according to the treatment course, compared to the other groups. Then, in the order of PD-L1+/PVR+ patient group, PD-L1−/PVR− patient group, and PD-L1−/PVR+ patient group, progression-free survival and overall survival according to the treatment course were higher. That is, the PD-L1−/PVR+ patient group predicted to have a low therapeutic response to PD-1 blockage exhibited the lowest progression-free survival and overall survival.

Based on a result of Example 2 above, PD-L1 and PVR can be used as markers for response prediction to cancer immunotherapy, and the response to PD-1 therapy can be evaluated according to the expression pattern for two biomarkers. For example, a patient group with positive PD-L1 expression and negative PVR expression can be evaluated as having a higher response to the PD-1 blockade therapy. Furthermore, the patient group with PD-L1 expression negative and PVR expression positive can be evaluated as having a lower response to the PD-1 blockade therapy. For this patient group, immune checkpoint blockade strategy different from PD-1 blockade strategy, for example, TIGIT blockade strategy in which TIGIT is a receptor for PVR can be proposed, or a combination therapy of PD-1 blockade strategy and TIGIT blockade strategy can be proposed.

Example 3: Early Prediction of Therapeutic Response to PD-1 Blockades Based on the Expression Patterns of PD-L1 and PVR in Mouse Model Hereinafter, the evaluation results of the therapeutic response prediction to the anti-PD-1 therapy according to the expression patterns of PD-L1 and PVR in the tumor tissue of a mouse model will be described with reference to FIGS. 4A to 4H.

FIGS. 4A to 4H show the results of verifying the therapeutic response to anti-PD-1 therapy in a mouse model according to the expression patterns of PD-L1 and PVR used as biomarkers in various embodiments of the present disclosure using gene regulations.

Figure 4A:
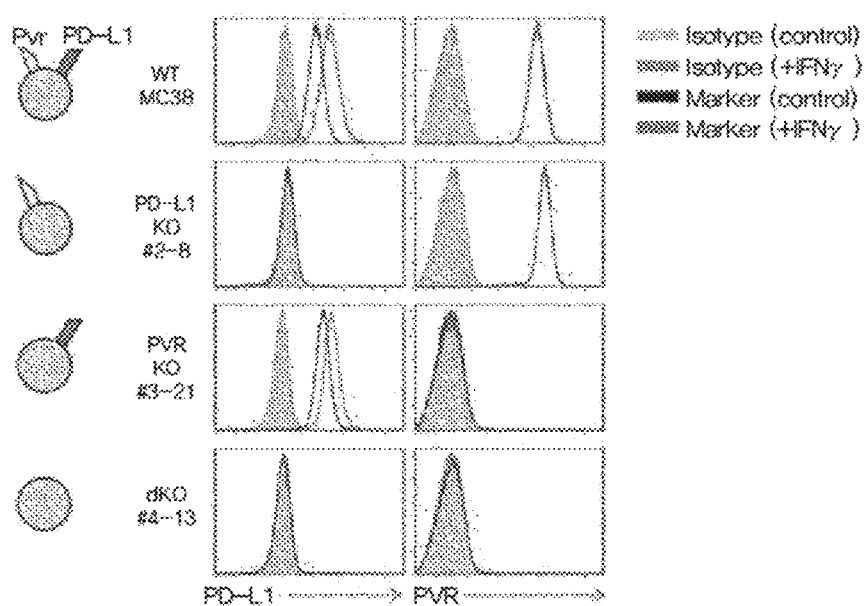

Referring to FIG. 4A, in order to obtain tumor cell lines having 4 expression patterns of PD-L1+/PVR−, PD-L1+/PVR+, PD-L1−/PVR− and PD-L1−/PVR+, CRISPR-Cas9 technique was performed to selectively knock-out (KO) PD-L1 and/or PVR for the tumor cell line MC38 of a mouse model having positive PD-L1 and PVR expressions. As a result, the PD-L1+/PVR+ cell line WT (wild type) MC 38, the PD-L1−/PVR+ cell line PD-L1 KO MC 38, the PD-L1+/PVR− cell line PVR KO MC 38 and PD-L1−/PVR− cell line dKO MC 38 were obtained.

Figure 4B:
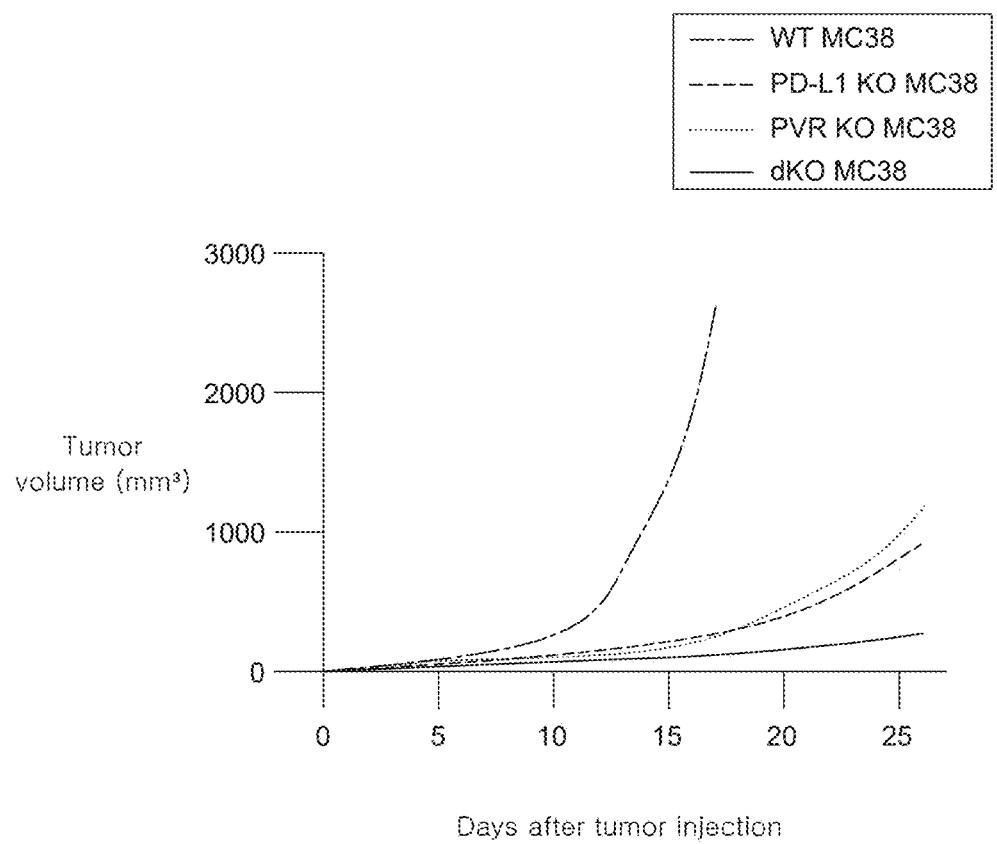

Referring to FIG. 4B, after implanting the four tumor cell lines constructed by the above-described method in FIG. 4A into a mouse model, the results of analyzing tumor progression are shown. More specifically, the PD-L1 or PVR expression negative mouse model (PD-L1 KO MC 38 implanted model and PVR KO MC 38 implanted model) has slower tumor progression than the mouse model (WT MC 38 implanted model) having positive PD-L1 and PVR expressions has. In particular, the mouse model (dKO MC 38 implanted model) in which both PD-L1 and PVR expressions are negative exhibited to be significantly slower in tumor progression than other mouse models.

Referring to (a) and (b) in FIGS. 4C and 4D, the analysis results of tumor progression based on whether the expression of PD-L1 or PVR is positive in a tumor cell line and a mouse as the host into which the tumor cell line was implanted are shown. More specifically, when knocking out PD-L1 or PVR in the mouse model, the tumor progressed rapidly to a degree similar to that of the WT mouse model having PD-L1 and PVR expression positive. These results can mean that whether the expression of PD-L1 or PVR is positive in the mouse model as the host in which the tumor cell line was implanted is less influential than whether the expression of PD-L1 or PVR is positive in the tumor cell line. That is, the tumor progression can be dependent on the tumor cell line implanted in the mouse.

Referring to FIGS. 4E to 4H (a) to (d) in FIG. 4D, the results of survival and tumor progression analysis for a mouse model transplanted with a tumor cell line of PD-L1 KO MC38 and a mouse model transplanted with a tumor cell line of PVR KO MC38 are shown. More specifically, the mouse model transplanted with the tumor cell line of PVR KO MC38 of PD-L1+/PVR− has significantly increased survival and significantly slowed progression of tumor under anti-PD-1 blockade (αPD-1) treatment than the mouse model transplanted with the tumor cell line of PD-L1 KO MC38 of PD-L1−/PVR+ has.

Based on a result of Example 3 above, the therapeutic response to the anti-PD-1 therapy can vary based on the expression patterns of PD-L1 and PVR in the tumor tissue obtained from the mouse model, and more specifically, the expression patterns of PD-L1 and PVR of the transplanted tumor cell line and the host. Accordingly, a method for providing information on a prediction response for a therapeutic response according to various embodiments of the present disclosure and a kit using the same can predict the therapeutic response to cancer immunotherapy based on the expression patterns of PD-L1 and PVR, and then propose customized cancer immunotherapy in consideration of the patient's tumor microenvironment.

Example 4: Setting Up Cancer Immunotherapy Having High Therapeutic Response Based on the Expression Patterns of PD-L1 and PVR Hereinafter, a method of setting an alternative treatment therapy to PD-1 blockage based on the expression patterns of PD-L1 and PVR will be described in detail with reference to FIGS. 5A to 5C.

Figure 5A:
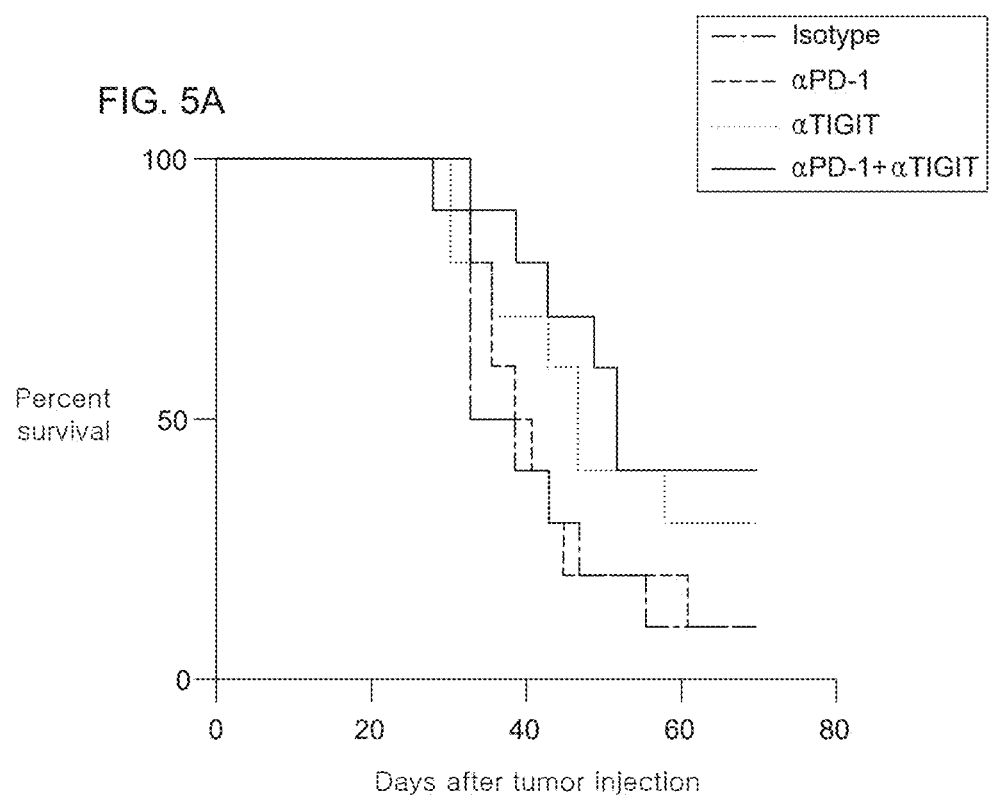
FIGS. 5A to 5C show the results that can suggest an appropriate cancer immunotherapy method based on whether therapeutic response to the PD-1 blockage is low or high or immune checkpoint ligand expression, according to a method for providing information on a therapeutic response to cancer immunotherapy according to an embodiment of the present disclosure.
Figure 5B:
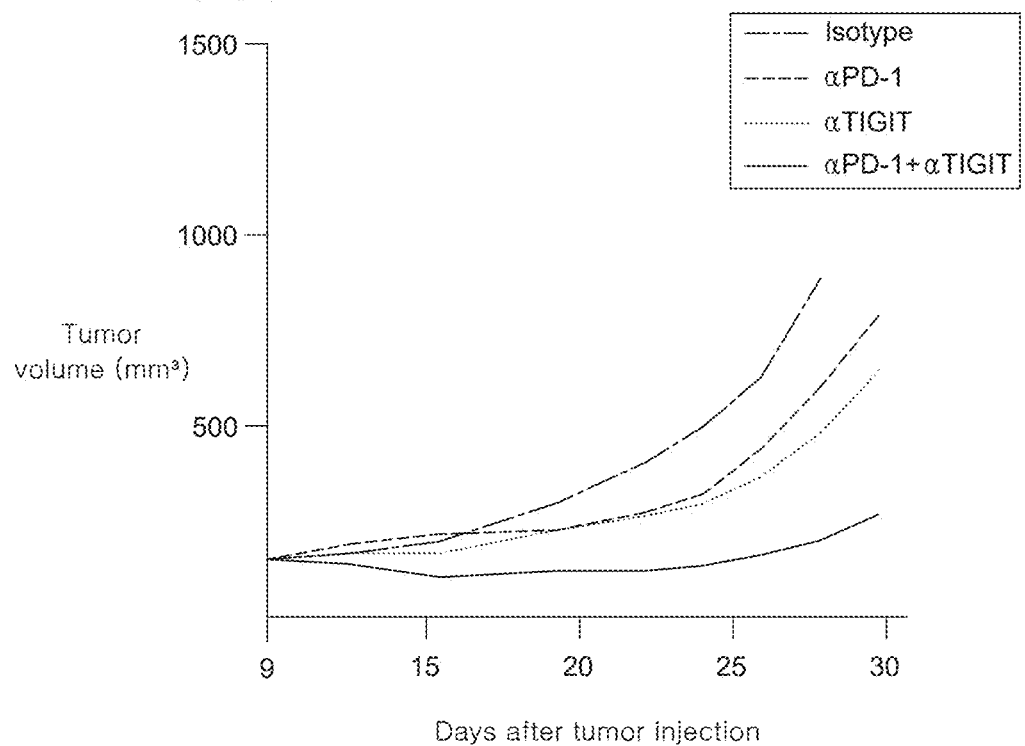
Figure 5C:
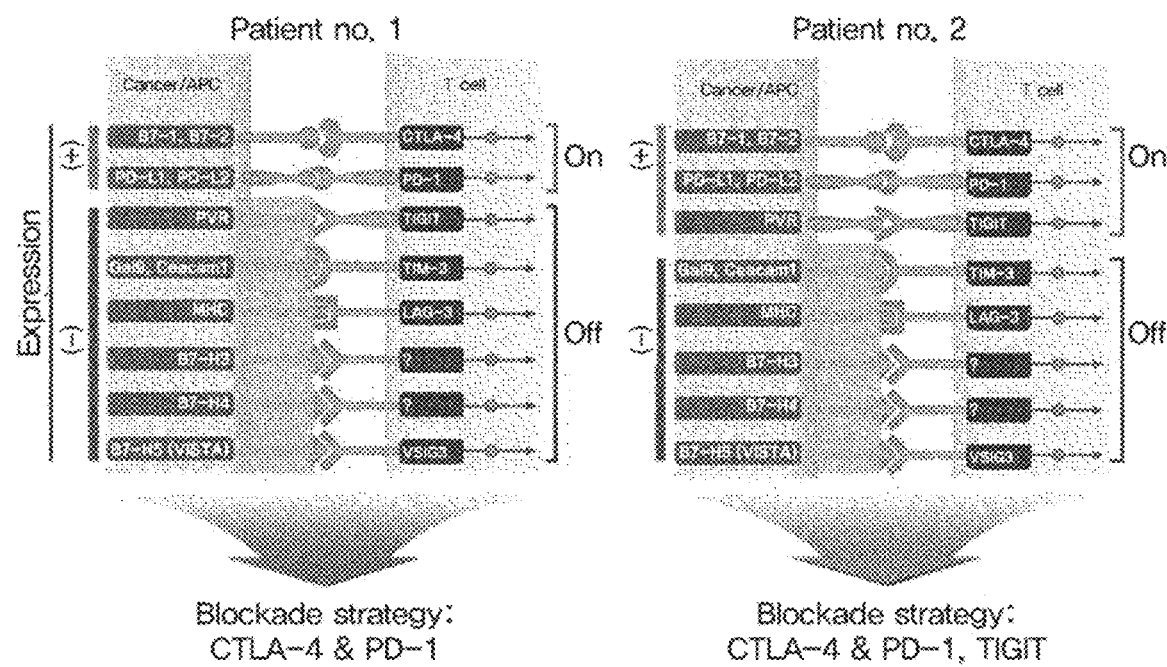

FIGS. 5A to 5C show the results that can suggest an appropriate cancer immunotherapy method based on whether a therapeutic response to the PD-1 blockage is low or high or immune checkpoint ligand expression, according to a method for providing information on a therapeutic response to cancer immunotherapy according to an embodiment of the present disclosure.

Referring to FIGS. 5A and 5B, the analysis results of the therapeutic response to the cancer immunotherapy in the mouse model having PD-L1−/PVR+ implanted with the tumor cell line of PD-L1 KO MC38 as described above in Example 3 are shown. In this connection, the cancer immunotherapy as performed is anti-PD-1 therapy, anti-TIGIT therapy, and combination therapy of anti-PD-1/anti-TIGIT. The mouse model having PD-L1−/PVR+ can be predicted to have the lower therapeutic response to PD-1 blockage, according to the method for providing information on the therapeutic response according to various embodiments of the present disclosure.

Referring to FIGS. 5A and 5B, the PD-L1−/PVR+ mouse model exhibited high survival and low tumor progression when anti-TIGIT therapy, or anti-PD-1/anti-TIGIT combination therapy was performed than when anti-PD-1 therapy was conducted. That is, in the mouse model of PD-L1−/PVR+, the response to the anti-TIGIT therapy and the combination therapy of anti-PD-1/anti-TIGIT can be higher than that of the anti-PD-1 therapy. As described above, cancer immunotherapy having a high therapeutic response can vary depending on the expression patterns of PD-L1 and PVR.

Referring to FIG. 5C, in non-small lung cancer patient 1 (patient no. 1), B7-1 and B7-2 were expressed together with PD-L1 as an immune checkpoint ligand. In other words, even when a PD-1 blockade that inhibits the reaction of PD-L1 and PD-1 was administered thereto, the patient 1 can have low response to anti-PD-1 therapy, due to the reaction of B7-1 and B7-2 in tumor tissue and CTLA-4 in T cells. Accordingly, the patient 1 can be expected to have higher anti-cancer treatment effects when anti-PD-1 therapy and anti-CTL-4 treatment were combined with each other than when anti-PD-1 therapy was performed alone.

Furthermore, in the non-small lung cancer patient 2 (patient no. 2), B7-1 and B7-2, and PVR were expressed along with PD-L1. In other words, even when a PD-1 blockade that inhibits the reaction of PD-L1 and PD-1 was administered thereto, the patient 2 can have lower response to anti-PD-1 therapy due to reaction of B7-1 and B7-2 of the tumor tissue and CTLA-4 of T-cells, or due to the reaction of PVR of the tumor tissue and TIGIT of T-cells. Thus, the patient 2 can be expected to have a higher anticancer treatment effect when anti-PD-1 therapy was combined with anti-CTL-4 therapy or/and anti-TIGIT therapy than when anti-PD-1 therapy was conducted alone.

Based on a result of Example 4 above, it is confirmed that anti-TIGIT therapy or combination therapy of anti-PD-1/anti-TIGIT can effectively act as an alternative treatment to the PD-L1−/PVR+ patient group evaluated to have a low response to anti-PD-1 therapy according to the method for providing information on the therapeutic response to cancer immunotherapy in the present disclosure. Accordingly, the present disclosure predicts the early therapeutic response of the subject to the cancer immunotherapy, especially, PD-1 blockage at high sensitivity, and thus can provide information to quickly determine whether to further proceed with anti-PD-1 therapy or whether the anti-PD-1 therapy is to be combined with other immunotherapies.

The results of Examples 1 to 4 indicate that responses to the first treatment of patients with non-small lung cancer can be predicted early based on the expression patterns of PD-L1 and PVR. That is, PD-L1 and PVR, or PVR can act as practical indicators for prediction of the therapeutic response to immunotherapies of non-small lung cancer.

However, the present disclosure is not limited to the above, and can be used to provide information for the prediction of a therapeutic response to a variety of immunotherapy methods. For example, the present disclosure can be configured to provide information for prediction of the therapeutic response to at least one therapy selected from the group consisting of anti-CTLA-4 therapy, anti-PD-1 therapy, anti-CD28 therapy, anti-KIR therapy, anti-TCR therapy, anti-LAG-3 therapy, anti-TIM-3 therapy, anti-TIGIT therapy, anti-A2aR therapy, anti-ICOS therapy, anti-OX40 therapy, anti-4-1BB therapy, and anti-GITR therapy.

Furthermore, the present disclosure can further provide an information providing kit configured to predict a therapeutic response to cancer immunotherapy as the kit contains a formulation configured to measure the expression levels of PD-L1 and PVR, respectively, for a biological sample isolated from a subject.

The features of the various embodiments of the present disclosure can be partially or entirely coupled or combined with each other. As those skilled in the art can fully understand, various technical associations and operations therebetween can be realized. The embodiments may be implemented independently of each other and may be implemented together in a combined relationship.

Although the embodiments of the present disclosure have been described in more detail with reference to the accompanying drawings, the present disclosure is not necessarily limited to these embodiments. Various modifications can be made within the scope of the technical idea of the present disclosure. Therefore, the embodiments disclosed in the present disclosure are not intended to limit the technical idea of the present disclosure thereto. The scope of the technical idea of the present disclosure is not limited to the embodiments. Therefore, it should be understood that the embodiments described above are illustrative in all respects and not limiting. The scope of protection of the present disclosure should be construed by the claims below. All technical ideas within the scope of the equivalents thereto should be construed as being included in the scope of the present disclosure.

National R&D project 1 that supported the present disclosure, Project Identification Number: 2017R1A5A1014560, Ministry Name: Ministry of Science and Technology Information and Communication, Research Management Organization: Korea Research Foundation, Research Project Name: Leading Research Center Business Science (SRC), Research Project Title: Center for Immune Research on Non-lymphoid Organ, Contribution Percentage: ⅕, Host Institution: Yonsei University Industry-Academic Cooperation Foundation, Research Period: 2017 Jun. 1 to 2024 Feb. 28

National R&D project 2 that supported the present disclosure, Project Identification Number: 2018M3A91-13024850, Ministry Name: Ministry of Science and Technology Information and Communication, Research Management Organization: Korea Research Foundation, Research Project Name: Biomedical Technology Development Project-Grand Challenge, Research Project Title: Developing a precision immunotherapy method based on engineered bacteria, Contribution Percentage: ⅕, Host Institution: Yonsei University Industry-Academic Cooperation Foundation, Research Period: 2018 Apr. 1 to 2026 Dec. 31, National R&D project 3 that supported the present disclosure, Project identification Number: 2015R1A2A1A10056084, Ministry Name: Food and Drug Safety Evaluation Institute, Research Management Organization: Food and Drug Safety Evaluation Institute, Research Project Name: Safety Evaluation Technology Development Research Project (Personalized Drug Evaluation Base Research), Research Project Title: Research on development of immune anticancer drug response prediction/evaluation method, Contribution Percentage: ⅕, Host Institution: Yonsei University Industry-Academic Cooperation Foundation, Research Period: 2018 May 16 to 2020 Nov. 30, National R&D project 4 that supported the present disclosure, Project Identification Number: NRF-2017M3A9E9072669, Ministry Name: Ministry of Science and Technology Information and Communication, Research Management Organization: Korea Research Foundation, Research Project Name: Biomedical Technology Development Project, Research Project Title: High-precision preclinical model using patient-derived circulating tumor cells, identification of the mechanism of acquired resistance to anticancer drugs through construction and presentation of treatment strategies, Contribution Percentage: ⅕, Host Institution: Yonsei University Industry-Academic Cooperation Foundation, Research Period: 2017 Sep. 1 to 2022 May 31

National R&D project 5 that supported the present disclosure, Project identification Number: NRF-2017R1D1A1B03029874, Ministry Name: Ministry of Science and Technology information and Communication, Research Management Organization: Korea Research Foundation, Research Project Name: individual basic research in science and engineering (basic, regional), Research Project Title: Immuno-anticancer drugs using immune markers in peripheral blood of lung cancer patients, establishment of effective immuno-cancer treatment strategies through identification of treatment predictors. Contribution Percentage: ⅕, Host institution: Yonsei University Industry-Academic Cooperation Foundation, Research Period: 2017 Jun. 1 to 2020 May 31

The invention claimed is:

1. A method of treating non-small lung cancer in a patient having received a first cancer immunotherapy treatment, comprising:
   measuring expression levels of PD-L1 and poliovirus receptor (PVR), respectively, in a biological sample isolated from the patient;
   evaluating a therapeutic response to the cancer immunotherapy for the subject, based on the measured expression levels of PD-L1 and PVR;
   administering a second cancer immunotherapy treatment of one of an anti-PD-1 therapy, an anti-TIGIT therapy, and combined anti-PD-1/anti-TIGIT therapy based on the results of the evaluation,
   wherein the biological sample includes at least one selected from a group consisting of tumor tissue, blood, serum, and plasma.

2. The method of claim 1, wherein the evaluating of the therapeutic response to the cancer immunotherapy includes:
   when the measured expression level of each of the PD-L1 and PVR is greater than or equal to a predetermined level, determining each of expressions of PD-L1 and PVR as positive and
   when the measured expression level of each of the PD-L1 and PVR is lower than the predetermined level, determining each of expressions of PD-L1 and PVR as negative; and
   evaluating the therapeutic response to the cancer immunotherapy, based on whether the expressions of PD-L1 and PVR are negative or positive,
   wherein the cancer immunotherapy includes one therapy selected from a group consisting of anti-PD-1 therapy, anti-TIGIT therapy, and anti-PD-1/anti-TIGIT combination therapy.

3. The method of claim 2, wherein the evaluating of the therapeutic response to the cancer immunotherapy includes: evaluating that a subject having the PD-L1 expression positive and the PVR expression negative has the therapeutic response to the anti-PD-1 therapy higher than the therapeutic response to the anti-PD-1 therapy of one of a subject having the PD-L1 expression positive and the PVR expression positive, a subject having the PD-L1 expression negative and the PVR expression negative, and a subject having the PD-L1 expression negative and the PVR expression positive.

4. The method of claim 2, wherein the predetermined levels for the PD-L1 and the PVR are TPS (Tumor Proportion Score) 10% and TPS 60%, respectively.

5. The method of claim 1, wherein evaluating the therapeutic response comprises:
   determining expressions of PD-L1 and PVR as positive when the measured expression level is greater than or equal to a predetermined level, and as negative when the measured expression level is lower than the predetermined level, and wherein the predetermined levels for PD-L1 and PVR are TPS (Tumor Proportion Score) 10% and TPS 60%, respectively.

6. The method of claim 1, wherein evaluating the therapeutic response comprises:

evaluating that a patient having PD-L1 expression positive and PVR expression negative has a therapeutic response to the anti-PD-1 therapy higher than the therapeutic response to anti-PD-1 therapy of:
- a patient having PD-L1 expression positive and PVR expression positive,
- a patient having PD-L1 expression negative and PVR expression negative, or
- a patient having PD-L1 expression negative and PVR expression positive.

7. The method of claim 1, wherein evaluating the therapeutic response comprises evaluating that a patient having PD-L1 expression negative and PVR expression positive has a therapeutic response to anti-TIGIT therapy or anti-PD-1/anti-TIGIT combination therapy higher than the therapeutic response to anti-PD-1 therapy.

8. A method of preparing a sample comprising:
(a) extracting a plurality of cells from a sample of tumor tissue obtained from non-small lung cancer patients subjected to anti-PD-1 therapy;
(b) marking the cells for expression of each of PD-L1 and poliovirus receptor (PVR); and
(c) analyzing the marked cells based on a level of expression for each of PD-L1 and PVR.

\* \* \* \* \*